UNITED STATES PATENT OFFICE.

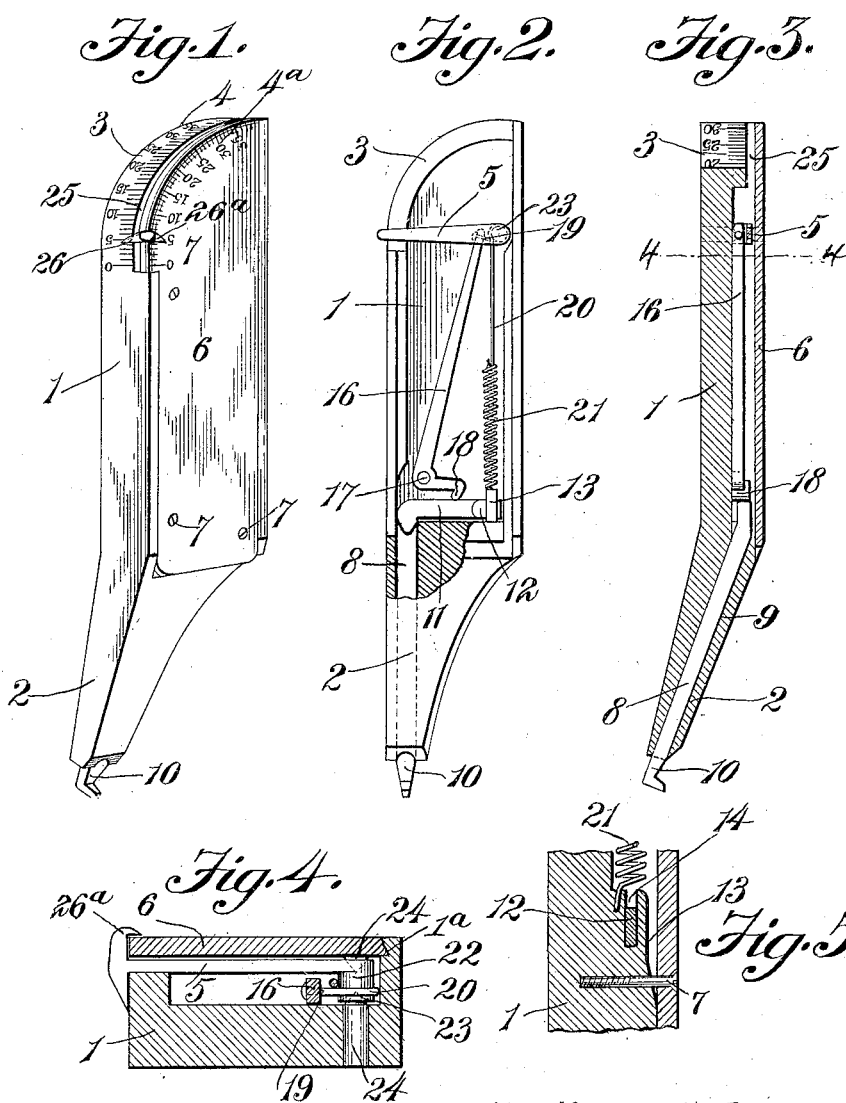

WILLIAM ALFRED JAMES, OF AURORA, ILLINOIS.

SURFACE-INDICATOR.

No. 917,444.  Specification of Letters Patent.  Patented April 6, 1909.

Application filed July 23, 1907. Serial No. 385,212.

*To all whom it may concern:*

Be it known that I, WILLIAM ALFRED JAMES, a citizen of the United States, residing at Aurora, in the county of Kane and State of Illinois, have invented a new and useful Surface-Indicator, of which the following is a specification.

The invention relates to improvements in surface indicators.

The object of the present invention is to improve the construction of surface indicators, and to provide a simple, inexpensive and efficient device of this character, designed for testing work of lathes, planers and analogous machines, and capable of use in a tool holder and of accurately measuring the surface of the work to be turned or otherwise operated on.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a surface indicator, constructed in accordance with this invention. Fig. 2 is an elevation, the face plate being removed to illustrate the arrangement of the mechanism for communicating motion from the contact rod or member to the indicating hand. Fig. 3 is a longitudinal sectional view. Fig. 4 is a transverse sectional view on the line 4—4 of Fig. 3. Fig. 5 is a detail sectional view, illustrating the manner of mounting the guide for the transverse arm of the contact rod or member.

Like numerals of reference designate corresponding parts in all the figures of the drawing.

The body of the indicator consists of an oblong casing 1 and a hollow longitudinally disposed tapered arm or member 2, extending from one end of the casing and arranged at a slight angle to the same, but the hollow arm may be arranged in the same transverse plane as the oblong casing if desired. The body of the indicator is in the form of a lathe tool to enable it to be mounted in a tool post in the place of the tool for testing the work to be turned, and it is also adapted for use on a planer, or other machine. The positioning of the hollow arm or member 2 at an angle to the casing enables the device, when used in a lathe, to be arranged closer to the chuck or face plate than a straight arm. The inner or rear end 3 of the body is curved to provide an arcuate surface, which is provided with graduations 4, forming an arcuate scale to coöperate with a pivoted indicating hand 5. The body is also provided at one side with a removable face plate 6, secured by screws 7, or other suitable fastening devices in a recess of the body and adapted to cover the mechanism for communicating motion from a contact rod or member 8 to the indicating hand 5. The removable side or face plate 6 will in practice be dove-tailed in the recess of the body, as shown at 1ᵃ, and it is provided at the arcuate end of the latter with graduations 4ᵃ, the adjacent end edge of the face plate 6 being curved to correspond to the inner end 3 of the body.

The indicating rod or member 8 slides in a bore or opening 9 of the hollow arm or extension 2 of the body, and it is provided at its outer end with a laterally projecting head 10 for engaging the work. The inner end of the contact rod or member 8 is provided with a transversely disposed integral arm 11, extending across the casing at right angles to the rod or member 8 and located adjacent to the inner end of the arm or extension 2, and having its end 12 reduced and operating in a guide 13. The guide 13 consists of a lug, disposed longitudinally of the body at one end of the casing and provided with a slot 14 to receive the reduced end 12 of the arm 11. The slot 14 is arranged at one end of the lug, which is preferably formed integral with the body. When the work being tested comes in contact with the outer end of the rod or member 8, the latter is adapted to move inwardly or outwardly to indicate any irregularity in the surface tested or measured, and this inward or outward movement communicates motion to an angle lever 16, fulcrumed at its angle on a pivot 17 and consisting of a short transversely disposed arm, and a long longitudinally disposed arm. The short transversely disposed arm, which is arranged adjacent to the transverse arm of the contact rod or member, is provided with a projecting tooth or portion 18 for engaging the said arm 11, and the inward movement of the contact rod or member is adapted to swing the short arm of the angle lever inwardly.

The long arm of the angle lever is provided with a perforation through which is passed one end 19 of a flexible connection 20, consisting of a cord, piece of cat-gut, or other suitable material and connected at its other end to a spiral spring 21. The spring operates to return the indicating hand to its initial position, and it moves the contact rod or member outwardly and yieldably maintains the same in engagement with the work being tested and measured. The flexible connection is wrapped one or more times around an axle or spindle portion 22 of the oscillatory indicating hand 5, whereby when the bell crank lever is oscillated, the indicating hand or portion will be moved over the arcuate scale 3. The spring extends longitudinally of the casing and is suitably secured to the casing near the guide 13. As only a very delicate spring is necessary, it may consist of a coiled spring as shown, or a piece of rubber, or the like may be used. The end 19 of the flexible connection is knotted after being passed through the perforation of the lever 16, but it may be attached to the same in any other preferred manner.

The indicating hand 5 is provided at its inner or pivoted end with opposite conical bearing recesses 23 to receive conical ends of the cone bearings 24, but it may be pivotally mounted in any other preferred manner. The outer end of the indicating hand 5 extends through a slot or opening 25 of the casing, and it is provided with oppositely disposed laterally extending portions 26 and 26ª, which are pointed and arranged to move over the arcuate scale 4 of the inner end of the body and the scale 4ª at the side of the same. The slot or opening 25 is formed by recessing the ends of the body adjacent to the plate 6. When the long arm of the angle lever swings forwardly from the position indicated in Fig. 2 of the drawing, the indicating arm will move upwardly or outwardly over the arcuate scale, and the inward or rearward movement of the long arm of the angle lever will return the indicating arm to the inner end of the scale, which may be graduated in any desired manner. Also the graduations of the scale may be arranged in any other preferred manner at the curved end faces of the casing of the body.

Having thus fully described my invention, what I claim as new and desire to secure by Letters Patent, is:—

1. A surface indicator comprising a body having a longitudinal casing and provided at one end thereof with a hollow extension disposed longitudinally of the body and forming a continuation of the casing, a rod or member slidable in the hollow extension, an angle lever having one arm arranged to be actuated by the rod or member, an indicating hand having an axle or spindle portion, a flexible connection arranged on the axle or spindle portion and connected with the other arm of the angle lever, and a tension device connected with the other end of the flexible connection.

2. A surface indicator comprising a body portion consisting of an oblong casing provided at one end with a hollow longitudinal arm, a pivotally mounted indicator hand, a rod or member slidable in the hollow arm and provided at its inner end with a transverse arm, an angle lever pivoted within the casing and consisting of a short transverse arm having a projecting tooth engaging the transverse arm of the rod at the inner edge thereof, and a long arm extending longitudinally of the casing, and means for communicating motion from the long arm of the angle lever to the pivoted indicating hand.

3. A surface indicator comprising a body having a casing, a longitudinal contact rod or member slidable in the body and provided at one end with a transverse arm, an angle lever having one arm arranged to be actuated by the transverse arm of the contact rod or member, an indicating hand having an axle or spindle portion, a flexible connection passing at a point intermediate of its ends around the axle or spindle portion and connected at one end with the other arm of the angle lever, and a spring connected with the other end of the flexible connection.

4. A surface indicator comprising a casing provided at one end with a hollow arm, a pivotally mounted indicating hand located at the other end of the casing and having an axle or spindle portion, a contact rod or member slidable in the hollow arm and provided at its inner end with a transverse arm, a guide located within the casing and receiving the transverse arm of the contact rod or member, an angle lever having one of its arms arranged to be engaged and actuated by the contact rod or member, a flexible connection secured at one end to the other arm of the angle lever and having an intermediate portion of it arranged on the axle or spindle portion of the indicating hand for actuating the same, and a spring connected with the other end of the flexible connection.

5. A surface indicator comprising a body provided at one end with a hollow extension and having a curved face at its other end, said body being also provided at the latter end with side and end graduations, a contact rod or member slidable in the body and provided at one end with an arm, an angle lever mounted within the body and arranged to be actuated by the said arm, an indicating hand pivotally mounted within the body and provided with exteriorly arranged oppositely disposed projecting portions arranged to move over the side and end graduations, and a tension device connected with the angle lever and with the indicating hand for operating the latter when the former is actuated.

6. A surface indicator comprising an oblong body adapted to be arranged in the tool post of a lathe and provided at one end with a hollow tapered arm arranged at an angle to the body, the other end of the body having graduations forming a scale an angularly bent rod slidable in the hollow arm and having its outer end projecting from the outer end of said arm, a pivoted indicating hand, and means for communicating motion from the inner end of said rod to the indicating hand.

In testimony that I claim the foregoing as my own, I have hereto affixed my signature in the presence of two witnesses.

WILLIAM ALFRED JAMES.

Witnesses:
 A. M. SCOTT,
 L. MOUAT, Jr.